United States Patent
Dent

(10) Patent No.: US 10,250,162 B2
(45) Date of Patent: Apr. 2, 2019

(54) DC BIAS PREVENTION IN TRANSFORMERLESS INVERTERS

(71) Applicant: Koolbridge Solar, Inc., Wrightsville Beach, NC (US)

(72) Inventor: Paul Wilkinson Dent, Pittsboro, NC (US)

(73) Assignee: KOOLBRIDGE SOLAR, INC., Wrightsville Beach, NC (US)

( * ) Notice: Subject to any disclaimer, the term of this patent is extended or adjusted under 35 U.S.C. 154(b) by 0 days.

(21) Appl. No.: 15/676,884

(22) Filed: Aug. 14, 2017

(65) Prior Publication Data
US 2019/0052191 A1    Feb. 14, 2019

(51) Int. Cl.
| | |
|---|---|
| *H02M 7/48* | (2007.01) |
| *H02M 7/5387* | (2007.01) |
| *H02M 7/49* | (2007.01) |
| *G05F 1/44* | (2006.01) |
| *H02M 7/5388* | (2007.01) |
| *H02M 7/5395* | (2006.01) |
| *H02M 7/46* | (2006.01) |

(52) U.S. Cl.
CPC .......... *H02M 7/53873* (2013.01); *G05F 1/44* (2013.01); *H02M 7/46* (2013.01); *H02M 7/48* (2013.01); *H02M 7/49* (2013.01); *H02M 7/5388* (2013.01); *H02M 7/5395* (2013.01); *H02M 2007/4803* (2013.01)

(58) Field of Classification Search
CPC ....... H02M 2007/4803; H02M 7/5395; H02M 7/53873; H02M 7/497; H02M 7/501; H02M 1/4233; H02M 7/521
USPC .... 363/40, 41, 42, 43, 95, 97, 98, 131, 132, 363/56.02, 58, 136; 323/906
See application file for complete search history.

(56) References Cited

U.S. PATENT DOCUMENTS

| | | | |
|---|---|---|---|
| 3,805,141 A | 4/1974 | Pompa, Jr. et al. | |
| 3,958,174 A | 5/1976 | Studtmann et al. | |
| 4,084,220 A | 4/1978 | Akamatsu | |
| 4,180,853 A | 12/1979 | Scorso, Jr. et al. | |
| 4,204,268 A | 5/1980 | Vivirito | |
| 4,320,449 A | 3/1982 | Carroll | |
| 4,803,611 A * | 2/1989 | Sashida ................. | H02M 7/48 363/132 |
| 4,882,120 A * | 11/1989 | Roe ................... | H02M 7/53875 363/37 |

(Continued)

FOREIGN PATENT DOCUMENTS

| | | |
|---|---|---|
| CN | 101350569 A | 1/2009 |
| CN | 202444440 U | 9/2012 |

(Continued)

OTHER PUBLICATIONS

INTERSIL, George E. Danz, HIP4080, 80V High Frequency H-Bridge Driver, Application Note. AN9324.4, Mar. 2003.

*Primary Examiner* — Alex Torres-Rivera
(74) *Attorney, Agent, or Firm* — Coats & Bennett, PLLC

(57) ABSTRACT

A transformerless DC to AC inverter providing an AC output at a power line voltage and at a power line frequency suitable for driving AC loads or appliances and having DC bias measurement circuitry for continuously assessing the magnitude of any DC bias component on the AC output, such as due to fault conditions or non-linear loads, and operative to eliminate or reduce any unwanted DC bias component from the AC output.

13 Claims, 8 Drawing Sheets

(56) References Cited

U.S. PATENT DOCUMENTS

| | | | |
|---|---|---|---|
| 5,226,077 A | 7/1993 | Lynn et al. | |
| 5,270,636 A | 12/1993 | Lafferty | |
| 5,373,433 A | 12/1994 | Thomas | |
| 5,424,894 A | 6/1995 | Briscall et al. | |
| 5,479,086 A | 12/1995 | Konstanzer | |
| 5,625,276 A | 4/1997 | Scott et al. | |
| 5,680,302 A * | 10/1997 | Iwata | H02M 7/53873 363/132 |
| 5,714,869 A | 2/1998 | Tamechika et al. | |
| 5,726,505 A | 3/1998 | Yamada et al. | |
| 5,867,376 A * | 2/1999 | Nakamura | H02M 7/48 363/132 |
| 5,930,128 A | 7/1999 | Dent | |
| 5,991,645 A | 11/1999 | Yuen et al. | |
| 6,051,954 A | 4/2000 | Nagao et al. | |
| 6,154,379 A * | 11/2000 | Okita | H02M 7/48 363/40 |
| 7,057,485 B2 | 6/2006 | Preusse et al. | |
| 7,082,040 B2 | 7/2006 | Raddi et al. | |
| 7,138,730 B2 | 11/2006 | Lai | |
| 7,474,016 B2 | 1/2009 | Wang et al. | |
| 8,891,211 B2 | 11/2014 | Dent | |
| 8,937,822 B2 | 1/2015 | Dent | |
| 9,455,645 B1 | 9/2016 | Zhou et al. | |
| 9,887,640 B2 * | 2/2018 | Eren | H02M 7/5387 |
| 2002/0047455 A1 | 4/2002 | Dhyanchand et al. | |
| 2003/0094929 A1 | 5/2003 | Pendell | |
| 2003/0094931 A1 | 5/2003 | Renyolds | |
| 2003/0179063 A1 | 9/2003 | Preusse et al. | |
| 2003/0218441 A1 * | 11/2003 | Kalman | H02M 7/53873 318/568.22 |
| 2004/0100149 A1 | 5/2004 | Lai | |
| 2005/0001598 A1 | 1/2005 | Belokon et al. | |
| 2005/0056021 A1 | 3/2005 | Belokon et al. | |
| 2005/0073292 A1 | 4/2005 | Hastings et al. | |
| 2005/0180083 A1 | 8/2005 | Takahara et al. | |
| 2006/0158037 A1 | 7/2006 | Danley et al. | |
| 2007/0095062 A1 | 5/2007 | Chertok | |
| 2007/0292724 A1 | 12/2007 | Gilchrist | |
| 2009/0161392 A1 * | 6/2009 | Zhang | H02M 7/5387 363/40 |
| 2009/0184706 A1 | 7/2009 | Duric et al. | |
| 2009/0206666 A1 | 8/2009 | Sella et al. | |
| 2010/0064424 A1 | 3/2010 | Hsu et al. | |
| 2011/0037600 A1 | 2/2011 | Takehara et al. | |
| 2011/0043160 A1 | 2/2011 | Serban | |
| 2011/0090607 A1 | 4/2011 | Luebke et al. | |
| 2011/0140520 A1 | 6/2011 | Lee | |
| 2011/0285354 A1 | 11/2011 | Iwasa | |
| 2011/0301772 A1 | 12/2011 | Zuercher et al. | |
| 2012/0007459 A1 | 1/2012 | Mondal et al. | |
| 2012/0048325 A1 | 3/2012 | Matsuo et al. | |
| 2012/0049637 A1 | 3/2012 | Teichmann et al. | |
| 2012/0112557 A1 | 5/2012 | Sager | |
| 2012/0242145 A1 | 9/2012 | Espeut, Jr. | |
| 2012/0281444 A1 | 11/2012 | Dent | |
| 2013/0057997 A1 | 3/2013 | Dent | |
| 2013/0058144 A1 * | 3/2013 | Hiramatsu | H02M 1/12 363/131 |
| 2013/0070494 A1 | 3/2013 | Rotzoll | |
| 2013/0181655 A1 | 7/2013 | Yokoyama et al. | |
| 2013/0181703 A1 | 7/2013 | Ausserlechner | |
| 2013/0245614 A1 | 9/2013 | Seebruch | |
| 2013/0320929 A1 | 12/2013 | Walker et al. | |
| 2014/0062206 A1 | 3/2014 | Bryson | |
| 2014/0153303 A1 | 6/2014 | Potharaju | |
| 2014/0266289 A1 | 9/2014 | Della Sera et al. | |
| 2015/0008748 A1 | 1/2015 | Deboy et al. | |
| 2015/0043110 A1 | 2/2015 | Dent | |
| 2015/0217656 A1 | 8/2015 | Loftus et al. | |
| 2015/0229131 A1 | 8/2015 | Gerhardinger | |
| 2015/0349708 A1 | 12/2015 | Moslehi | |
| 2016/0036235 A1 | 2/2016 | Getsla | |
| 2016/0065090 A1 | 3/2016 | Dent | |
| 2016/0224083 A1 | 8/2016 | Dent et al. | |
| 2016/0226560 A1 | 8/2016 | Dent | |
| 2016/0261226 A1 | 9/2016 | Hamilton et al. | |
| 2016/0276837 A1 | 9/2016 | Manjrekar | |
| 2016/0372927 A1 | 12/2016 | Dent | |
| 2017/0279376 A1 * | 9/2017 | Siri | H02M 7/53871 |
| 2017/0346413 A1 | 11/2017 | Dent | |
| 2018/0006601 A1 | 1/2018 | Dent | |
| 2018/0026550 A1 | 1/2018 | Dent | |

FOREIGN PATENT DOCUMENTS

| | | |
|---|---|---|
| EP | 2544354 A2 | 1/2013 |
| EP | 2698894 A2 | 2/2014 |
| GB | 1433402 A | 4/1976 |
| WO | 2012140495 A2 | 10/2012 |
| WO | 2016033394 A1 | 3/2016 |
| WO | 2016204830 A1 | 12/2016 |

* cited by examiner

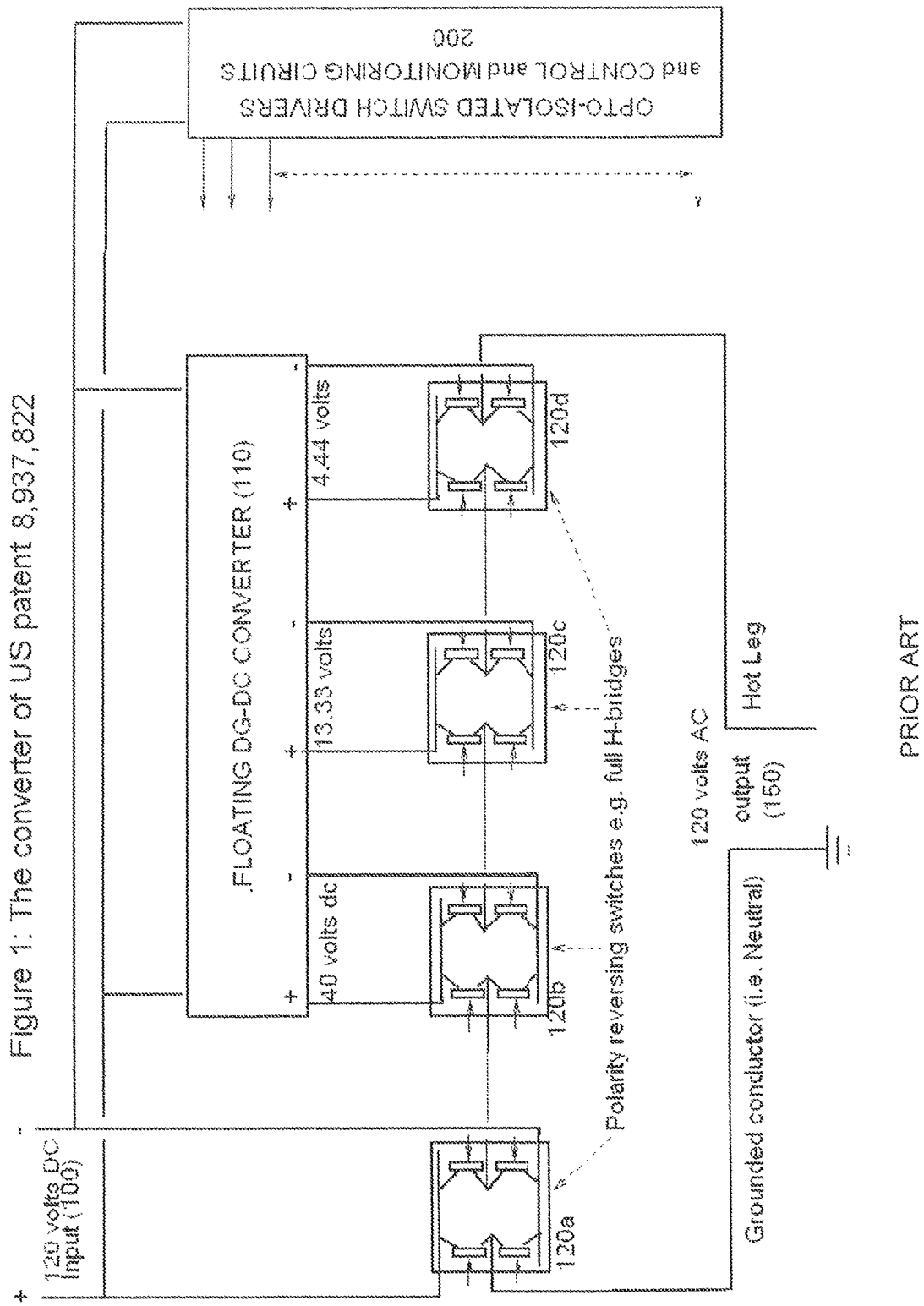

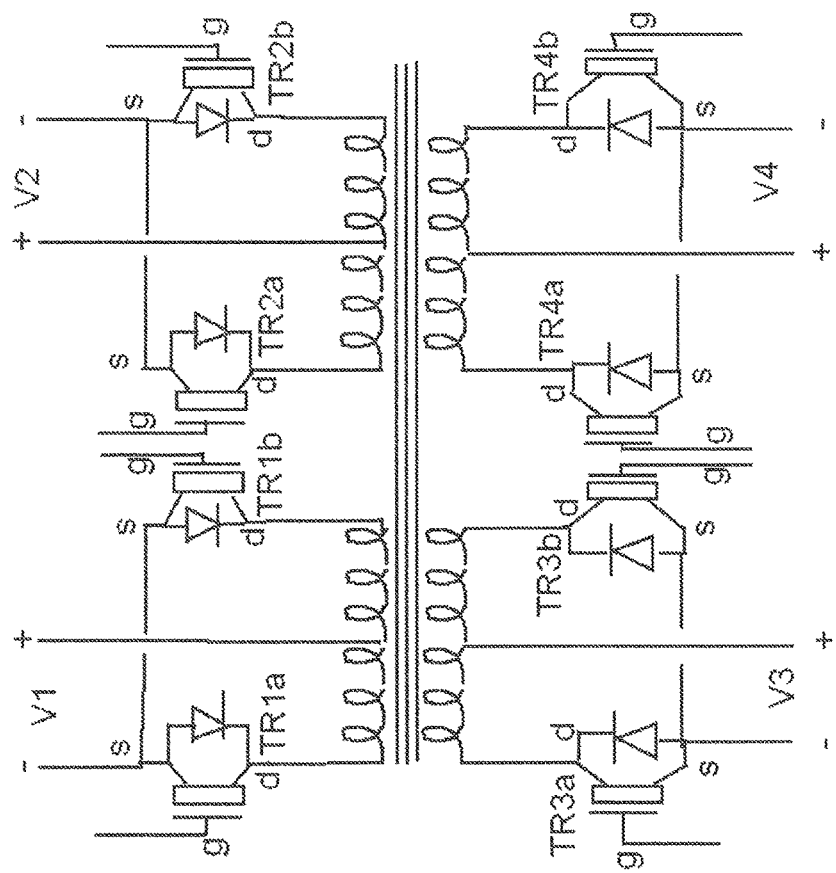
FIGURE 2: BIDIRECTIONAL DC-DC CONVERTER
PRIOR ART

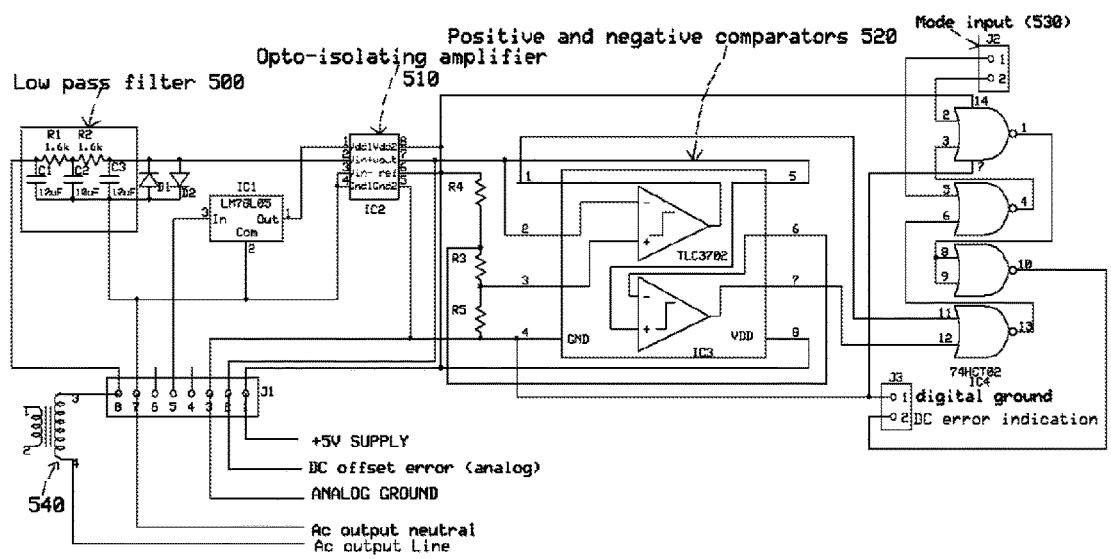
Figure 3: DC bias error determining circuit

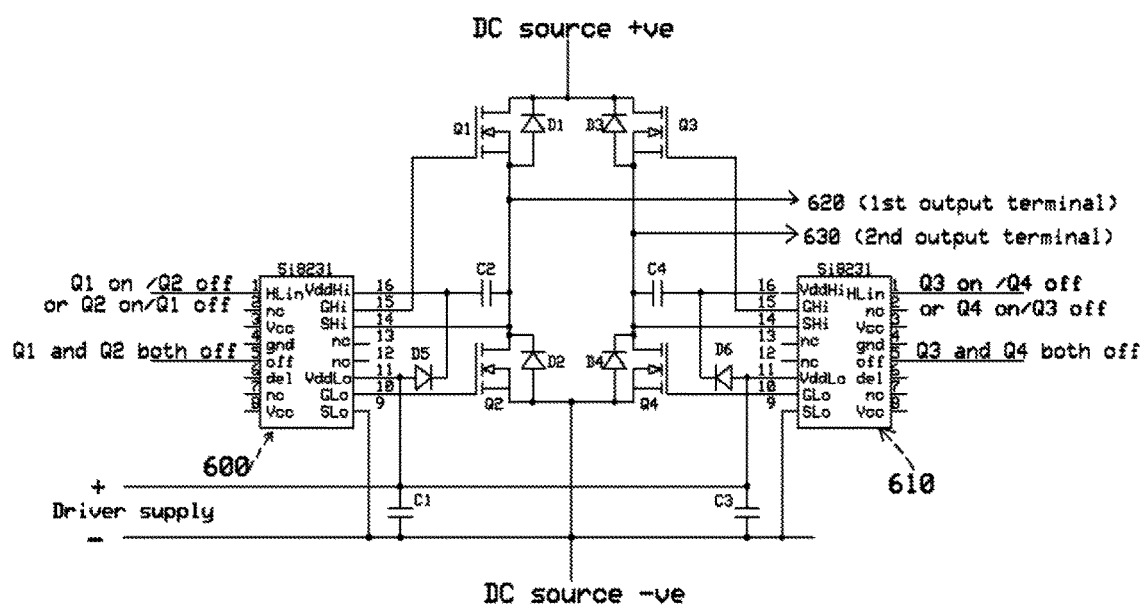
Figure 4: Controlled full h-bridge circuit

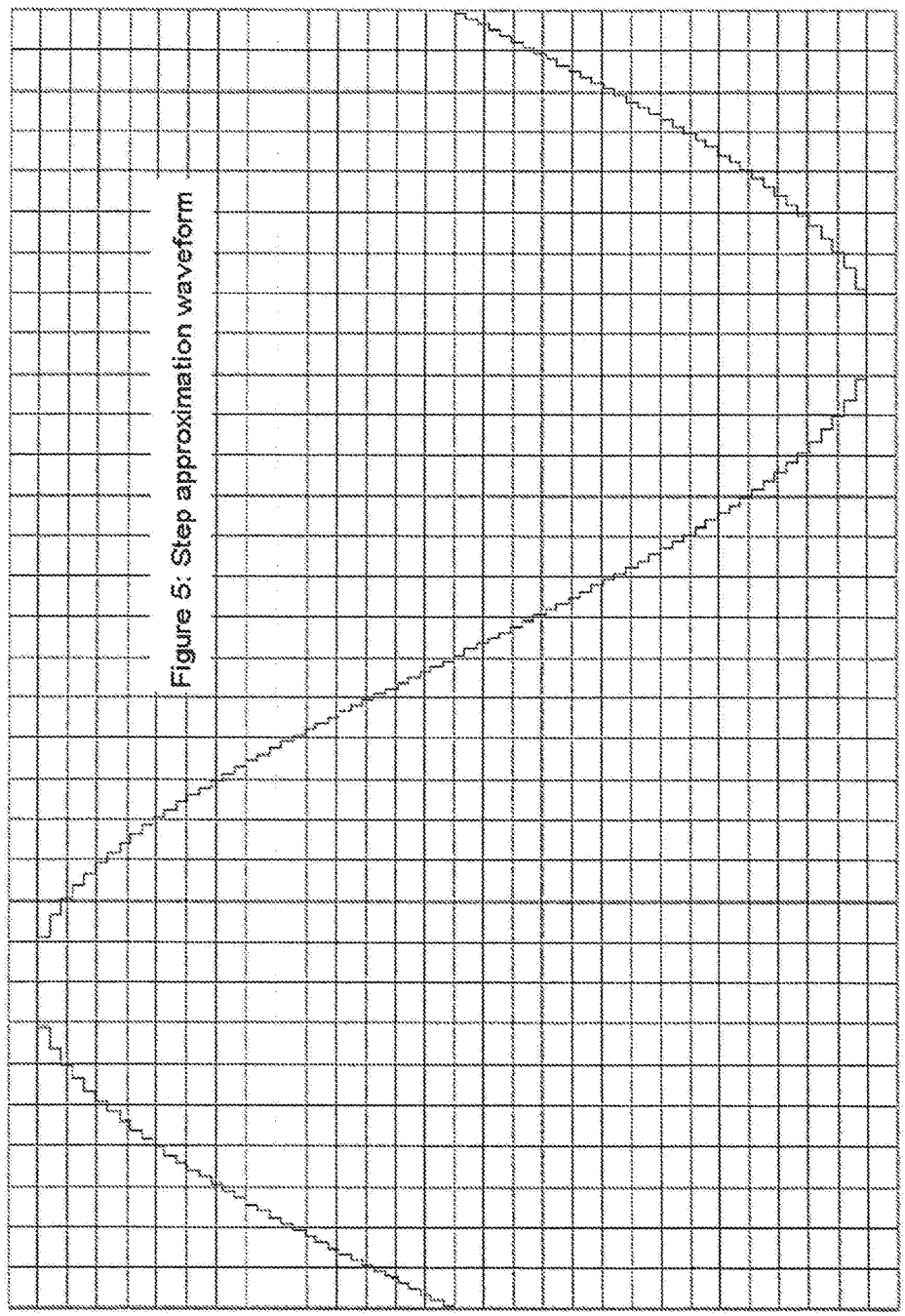
Figure 5: Step approximation waveform
PRIOR ART

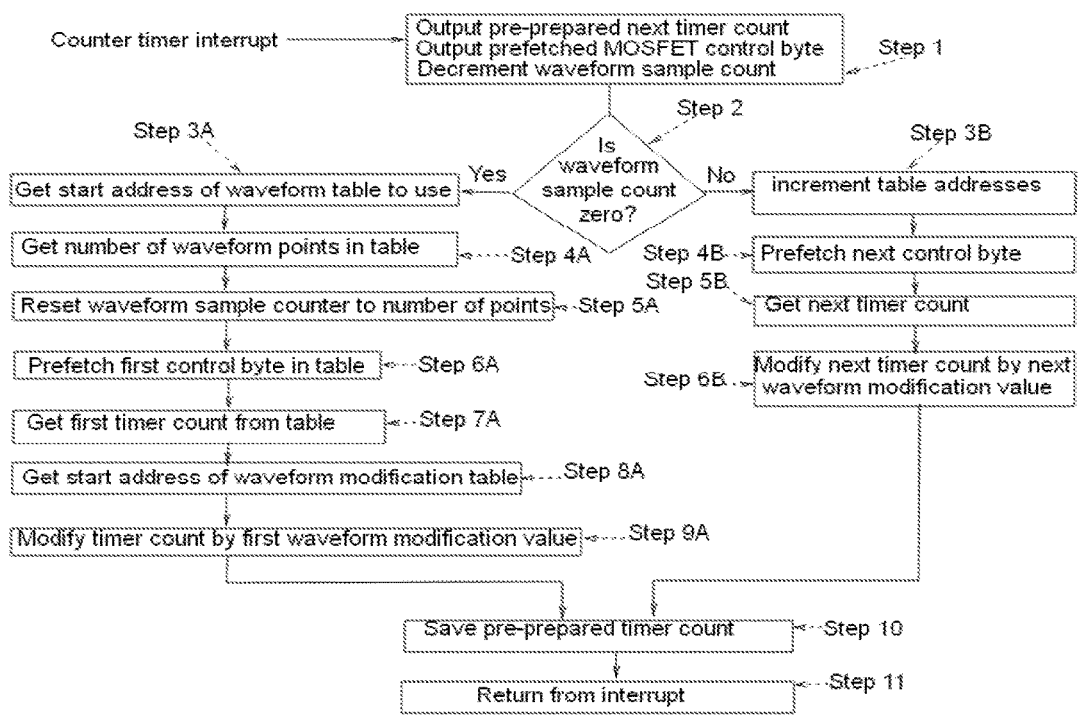
Figure 6: Flowchart for waveform generation

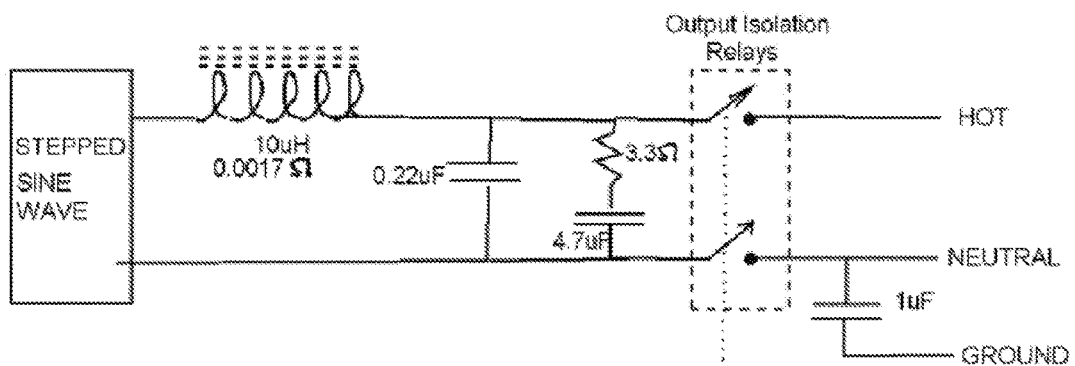
Figure 7: Inverter output filter and load disconnect relays

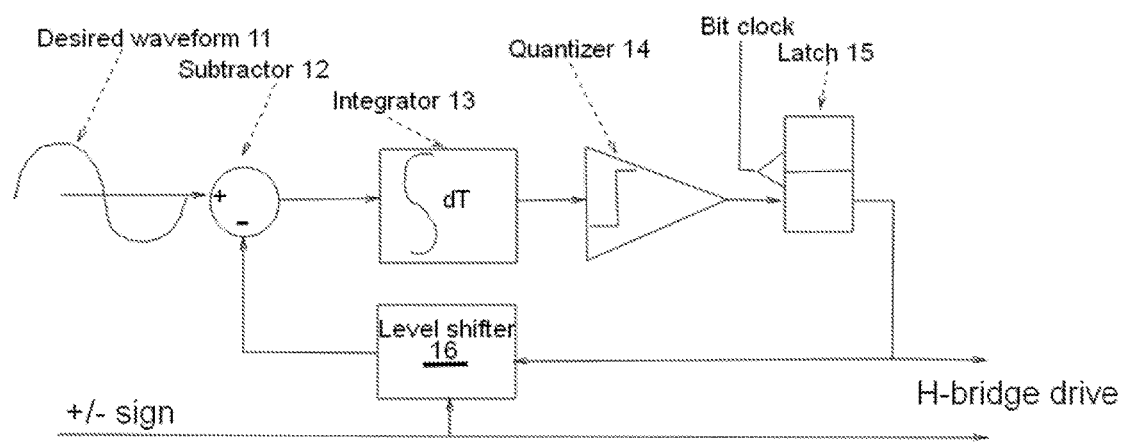
Figure 8: Analog equivalent of a bit-density modulator

DC BIAS PREVENTION IN TRANSFORMERLESS INVERTERS

FIELD OF INVENTION

The present invention relates generally to DC-to-AC converters, and in particular to systems and methods of preventing DC bias voltage in DC-AC converters that do not use a transformer.

BACKGROUND

Significant cost reductions in photovoltaic panels have spurred the installation of solar energy systems for supplying electricity. Solar panels produce DC power and are generally followed by a DC to AC converter, also known as an inverter, to produce a power output at the electric utility grid frequency of 50 Hz or 60 Hz, depending on the country. The most common solar installation feeds the AC power it produces back to the grid in return for some economic benefit. Relatively few solar installations are designed to operate totally off-grid, which requires a very large and expensive battery, to bridge periods of low insolation.

U.S. Pat. No. 8,937,822, filed May 8, 2011 by the present inventor and titled "Solar Energy Conversion and Utilization System," incorporated herein by reference in its entirety, discloses a beneficial system that does not aim to be totally off-grid but rather attempts to minimize grid power use and maximize use of self-produced solar energy. An adaptive power source selection unit is used to transfer as many loads as possible, at any given time, to solar while leaving the remainder on the grid. Such a system requires a much smaller battery than a totally off-grid system, yet still provides substantial back-up power in the event of grid outages. As the grid becomes saturated with fed-back solar power, the self-consumption system of the '822 patent is becoming of greater interest.

The '822 patent also describes a novel type of transformerless DC to AC inverter that results in size, cost and weight reductions. As used herein, the term "transformerless" refers to the absence of the very large transformers that are needed to handle power at 60 Hz. The term does not imply the total absence of wound components, which may still be used at lower power at high frequency, where their size and cost is considerably lower than those used for high power at low frequency. Transformerless inverters of other types are also possible. In particular, transformerless inverters may be designed and used to feed power back to the electric utility grid.

When power is fed back to the grid from a solar inverter, it is connected to a service drop transformer such as a pole-mounted transformer that steps the inverter voltage up to a high transmission voltage. Such utility transformers have very low winding resistance and would substantially prevent any small DC component from existing on the grid wiring. Moreover, grid-tie inverters are of a current source type, not a voltage source type, as the voltage they produce is determined by the grid. A current source inverter controls the current to produce negative and positive half sine waves of current of a determined peak value, and as such they inherently prevent any DC current build-up that would result from a DC bias on the inverter output.

However, inverters for self-consumption have to produce a sine wave of defined voltage. If voltage is controlled rather than current, it must be controlled in such a way that no significant DC bias is produced by mismatch between the positive and negative half cycles. A DC bias is undesirable for feeding appliances with transformers or motors that have a low DC winding resistance, which would result in a significant DC current bias occurring. For example, one way in which such a bias can result even in a well-adjusted inverter is if one of the loads contains a half-wave rectifier, as old vacuum tube TV sets often did. This results in one half cycle being more heavily loaded than the other, resulting in a voltage drop on one half cycle and not on the other. This is perceived by other appliances as a DC offset. In effect, other appliances assume some of the unbalance current of the half-wave rectifier, which is undesirable. Therefore there is a need in the art for circuits and methods to control the DC bias output from a transformerless voltage-source inverter.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

The AC output of a transformerless inverter is filtered to remove the AC voltage excursions to obtain the mean or DC bias value. On inverter power-up, before connection of the output to the load, the inverter may be operated while monitoring the no-load DC bias value, and adjusted if necessary to minimize the DC bias value. After connection of the load, the on-load DC bias value is continuously monitored, and adjustments to the waveform to eliminate the DC bias are determined by a digital processor, and applied to control the DC bias value to be substantially zero.

When generating the inverter output comprises transitioning between a finite number of predetermined voltage steps, adjustments to the waveform may comprise determining the time instants of the transitions from one voltage step to the next.

In one embodiment, if monitored DC bias exceeds a gross threshold, the inverter ceases to generate an output and disconnects from the load. It may then attempt to resume generating an output, after performing the step of readjusting the waveform off-load, to remove DC bias prior to reconnecting to the load.

Yet another safeguard against producing a DC output to the load under fault conditions is to limit the time for which certain switching transistor may stay in the on state.

One embodiment relates to a method of operating a transformerless DC to AC converter comprising circuitry including a switching matrix and a controller operative to control switches in the switching matrix to commutate DC inputs onto AC outputs so as to generate an approximation of an AC waveform at a desired power line frequency. The AC output of the converter is monitored for a DC bias component. The controller modifies the AC waveform generated, so as to reduce the DC bias component.

Another embodiment relates to a transformerless DC to AC converter. The converter includes circuitry connected between DC inputs and AC outputs, the circuitry including a plurality of transistor switches. The converter also includes a controller operative to control the switches to commutate DC inputs onto AC outputs so as to generate, at the AC outputs, an approximation of an AC waveform at a desired power line frequency. The converter further includes a measuring circuit connected to the controller and operative to continuously measure the value of a DC bias component on the AC output of the converter. The controller is operative to modify the AC waveform generated, so as to reduce the DC bias component.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 shows the DC to AC converter of U.S. Pat. No. 8,937,822.

FIG. 2 shows the bidirectional DC-DC converter of the '822 patent.

FIG. 3 shows a DC bias error determining circuit.

FIG. 4 shows a controlled full H-bridge.

FIG. 5 shows the output waveform of the inverter of FIG. 1.

FIG. 6 shows the flowchart for waveform generation.

FIG. 7 shows an inverter output filter and load disconnect circuit.

FIG. 8 shows an analog equivalent circuit for bit-density modulation.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Referring to FIG. 1, one DC-to-AC conversion apparatus of the above-incorporated '822 patent comprises an input (100) for a floating DC power source, for example 120 volts DC from ten 12-volt rechargeable batteries connected in series; a pair of output terminals (150) for the AC output, one of which may be connected to the grounded conductor or neutral of the AC load; a bidirectional DC-DC converter (110) for converting the DC input to a number of floating DC output voltages, and a set of reversing switches 120*a*-120*d* controlled by driver circuit 200.

H-bridge driver (200) may be isolated by optical or other means so that the voltage domain of the control system, which can be relative to ground, is independent of the power voltage domains of the H-bridges, which are various and are not grounded. An alternative DC to AC converter implementation of the '822 patent comprises connecting neutral to the −ve of the battery while generating a positive half sinewave on the LINE output by pulse width or bit density modulation, such as delta-sigma modulation, alternating at the power frequency rate with connecting neutral to the +ve of the battery while generating a negative half sinewave on the LINE output using pulse width or bit density modulation.

A key property of the DC-DC converter (110) is that power may instantaneously flow in either direction to or from any pair of input or output terminals. If the current flows out of a positive terminal, the direction of power flow is "out," while if current flows into a positive terminal, the direction of power flow is "in." The DC-DC converters of the above '888 patent are of a substantially lossless, switching type, implying that all power that flows in must come out, although the converter may optionally contain energy storage capacitors such there may be an instantaneous imbalance between input and output power as the capacitors are accumulating or releasing energy.

In one inverter embodiment of the '822 patent, the inverter output waveform to be generated is represented as a sequence of numerical samples, each numerical sample value being expressed as a number of digits in the ternary number system, e.g., the four ternary digits (T4, T3, T2, T1), wherein each digit Ti (i=1 . . . 4) can take on one of the three values: −1, 0 or +1. In correspondence with the place significance of the different ternary digits, a number of floating DC supplies are generated with ratios 1:1/3:1/9:1/27. Assuming a 120-volt DC input source, the floating DC supplies generated by converter 110 are therefore 40 v, 13.33 v, and 4.44 volts which are respectively ⅓rd, $\frac{1}{9}^{th}$, and 1/27th of the nominally 120 volt floating DC power source. The sum of the DC input and all outputs of the DC-DC converter is 120+40+13.33+4.44=177.77 volts when all four ternary digits are +1. This is the peak voltage that could be generated at the AC output (150), and corresponds to a useful sine wave output voltage of 125.7 volts rms.

If necessary, all the voltages can be scaled to produce other output voltages, for example 100v, 115, 120 v, 125 v, 220 v, etc., while still maintaining the power-of-3 ratios between the floating supply voltages. Other voltage outputs or waveforms (within the maximum available peak voltage of all DC supplies added together) may alternatively be generated by choosing the appropriate sequence of ternary digits. For example, the invention could be used to produce an output waveform for driving a vibration table for mechanical testing purposes, the waveform being either non-repetitive, or having a desired repetition frequency. Alternatively, it could be used as a high power guitar amplifier by digitizing the output of a guitar pick up and converting it to a sequence of ternary numbers at an adequate sample rate to avoid aliasing.

Other number systems than ternary could be used; for example, the binary number system could be used, or the quaternary number system could be used in which digits take on the values −3, −1, +1, or +3. However, ternary is of slightly lower component complexity per waveform step, and is therefore the presently preferred choice.

Continuing to refer to FIG. 1, the floating DC input and the floating outputs from DC-DC converter (110) each feed respective polarity reversing switches 120*a*, 120*b*, 120*c*, and 120*d*. The outputs of the switches are directly connected in series to the AC output 150, so that, by either inverting the selected polarity of each DC supply or not, or not selecting it, in accordance with a respective one of the ternary digits T4, T3, T2, T1, the series-connected output can be any of the 81 values 120T4+40T3+13.33T2+4.44T1 volts. For example, if all switches select the positive polarity, the output voltage will be 120+40+13.33+4.44=177.77 volts. If however the 4.44 volt switch is controlled to feed straight through, the output voltage will be 120+40+13.33=173.33 volts. If the 4.44 v switch is controlled to reverse the polarity, the output voltage will be 120+40+13.33−4.44=168.88 volts. By appropriate control of the switches therefore, any output voltage between −177.77 and +177.77 volts can be produced, in steps of 4.44 volts.

It is important to note that, when a DC source polarity is selected to oppose the output voltage and therefore the current flow, power is feeding backwards into the DC-DC converter, which must therefore be of a bi-directional design using for example synchronous rectifiers. It is a significant advantage to arrange that the voltage corresponding to the most significant ternary digit, or from which the greatest power is drawn, comes directly from the DC input, and does not pass through the DC-DC converter, as the DC-DC converter then only has to convert the remaining fraction of the total power. Most of the AC output power then comes directly from the DC input source, which improves the total conversion efficiency.

In order to generate a 60 Hz step-approximation to a 125.7 volt rms sinewave, the switches are controlled to select sequentially among the $3^4$=81 possible voltage levels from −177.77 to +177.77 volts and back again, repetitively in the proper sequence and at the proper times. One cycle therefore comprises nominally 2×81 voltage steps, so that the number of level changes per second is approximately 2×81×60=9720. This is somewhat rapid for mechanical switching means such as relays, rotary commutators, or cam-actuated contacts, but is well within the capability of semiconductor switches which can operate 100 times faster than the required speed. It is also much slower than the at least 200 KHz switching rate of an alternative inverter using for example delta-sigma modulation, and therefore entails lower switching losses. The full H-bridge of N-type power MOSFETs shown in FIG. 3 is the presently preferred switch.

Referring to FIG. 3, four N-type MOSFET power transistors labeled Tr(a), Tr(b), Tr(c), Tr(d) are connected between the DC input +ve terminal and the −ve terminal. By turning on transistors Tr(a) and Tr(d) while turning off transistors Tr(b) and Tr(c), the DC +ve input is connected to output pin 163 while DC −ve input is connected to pin 164. Conversely, by turning on transistors Tr(b) and Tr(c) while keeping transistors Tr(a) and Tr(d) off, the DC +ve input is connected to output terminal 164 while the DC −ve input is connected to output pin 163. A pass-through state is created either by turning on transistors Tr(a) and Tr(c) while holding Tr(b) and Tr(d) off, which connects the DC +ve input to both output terminals 163 and 164, or by turning on transistors Tr(b) and Tr(d) while holding Tr(a) and Tr(c) off, which connects the DC −ve input to both output terminals 163 and 164. These two pass-through states both give zero voltage output between terminals 163 and 164, but differ as to which polarity of the floating DC input is connected to the output terminals. Both pass-through states may be used in the invention at different times to synchronize the phase of line-frequency common mode signal appearing on the DC input with the grid, if that is desired.

A MOSFET is turned on or off by applying a positive or (negative or zero) voltage between its gate and its source. Since the sources of the upper MOSFETs Tr(a) and Tr(c) of the H-bridge are connected to different ones of the H-bridge outputs, and the sources of the lower two MOSFETs Tr(b) and Tr(d) of the H-bridge are connected to the negative of the DC supply, three different relatively floating supplies are required for the gate drivers IC(a), IC(b), IC(c), and IC(d). IC(b) and IC(d) may use the same gate driver supply, but IC(a) and IC(c) create separate supplies using bootstrap diodes D1 and D2 to charge capacitors C1 and C2, respectively. Further discussion of bootstrapping may be found in FIG. 4 of Intersil Application Note AN9324.4 dated March 2003, by George E. Danz, the disclosure of which is incorporated herein by reference, in its entirety.

To obtain a sine wave output voltage from the inverter of FIG. 1, controller 200 represents the sine wave as numerical samples expressed in the ternary number system. When using a finite number of digits, it might be necessary to approximate the desired output voltage by the nearest ternary combination, and there are many ways in which an approximation could be constructed. For example, a ternary digit can be jittered between two adjacent values on successive instants of a high-frequency clock in order to approximate an intermediate value. This method is however reserved for the variation in inverter design in which one of the ternary digits, e.g., the least significant digit T1, could be omitted, along with the associated components and the 4.44 volt floating supply, the value of T2 then being jittered between adjacent values at a high frequency so as to create a mean voltage between the 13.33 volt steps, thereby reducing component count. A low-pass LC interpolation filter is then connected at H-bridge 120c output to smooth the waveform. Frequent switching can be a source of additional switching losses, however switching only a low voltage supply such as 13.33 volts produces much less switching loss than jittering the 120-volt supply.

A second approach is to choose the nearest ternary approximation to the desired instantaneous output voltage at a sequence of successive, equi-spaced time intervals generated by a sampling clock. Yet another approach is to keep the ternary value fixed as long as it is the nearest approximation to the exact voltage, and to increment it or decrement it to the next adjacent value only at the instant that a different value becomes the nearest approximation. Storing the approximately 81 time-values of this sequence of switching instants has the benefit of requiring much less memory than storing the ternary digits at perhaps 32768 clock instants. Yet another approach is to compute the nearest ternary approximation to the desired instantaneous output voltage in real time.

FIG. 2 shows a bidirectional DC-DC converter for providing various floating DC output voltages such as Vdc/3, Vdc/9, and Vdc/27, using a DC source of Vdc volts. The DC-DC converter uses a high switching frequency such as 60 KHz, enabling the transformer to be much smaller than would be required for 60 Hz operation. The transformer in FIG. 2 has four windings, which have turns ratios N1:N2:N3:N4 in proportion to the voltage ratios V1:V2:V3:V4. Alternatively the transformer can be split into two or three transformers with their primaries paralleled or otherwise linked to maintain the desired voltage ratios. For the purposes of explanation, each winding has been shown as a center tapped winding with the center taps connected to the positive terminal of the DC inputs or outputs and the ends of the windings connected to the drains of N-type MOSFET pairs. However, one or more of the synchronous rectifier/inverter MOSFET pairs could be a full H-bridge connected to a non-center-tapped transformer winding. MOSFETs generally comprise a drain-to source body diode which is shown as part of the transistor.

One of the transistor pairs, for example TR1$a$ and TR1$b$, is commutated at 60 KHz and a voltage V1 is applied to that input. The other transistor pairs are commutated in synchronism and form synchronous rectifiers. For example, TR2*a* is switched on when the transformer winding end to which its drain is connected goes negative, thereby transferring the negative voltage to the −ve terminal of the V2 output. Likewise, TR2*b* is switched on when its drain goes negative, and the drain of TR2*a* goes positive; TR2*a* is switched off when its drain is positive and thus does not pass current. Thus a DC voltage V2 is produced at the V2 output which is N2/N1 times V1, where N2 and N1 are the numbers of turns on the respective transformer windings.

It can be seen that the input circuit for V1 is indistinguishable from any output circuit. Thus any one of the transistor pairs can function either as an inverter commutating a DC input or as a synchronous rectifier producing a DC output. Power flow can thus be from any port to any other port, depending on whether the port is sinking current or sourcing current. This is important to the operation, as power flows in the reverse direction whenever a ternary digit has the opposite sign to the instantaneous output voltage, or if the AC output current is not in phase with the AC output voltage due to the non-unity load power factor of a reactive load.

In designing a DC-to-DC converter, a trade off must be made between switching losses, copper loss in the windings, and hysteresis loss in the core. Using a higher frequency gives fewer turns of thicker wire, but core and switching losses increase. In the 60 KHz region, skin-effect limits the benefit of using wire sizes greater than about 23 AWG, so Litz wire comprising many strands of 23 AWG or smaller is preferably used to reduce copper loss.

Core loss persists even when the output power is zero, which can be a significant contributor to standby (no-load) current. In the inventive load converter of the '822 patent, it is however disclosed how standby current due to core and switching losses in the DC-DC converter can be reduced by use of a novel waveform. Firstly, the 40, 13.33, and 4.44 volt outputs of the DC-DC converter are provided with large reservoir capacitors. This has the first benefit that current in the transformer windings is proportional to the mean DC current of each output, rather than the peak current, thereby reducing copper losses in the windings. A second benefit is that the reservoir capacitors can supply the low currents required for light loads for at least one or more cycles of the 60 KHz switching frequency, enabling switching cycles to be periodically omitted. For example, if the load current is only 1/10th the peak output capability, then every alternate DC-DC converter switching cycle can be omitted and all the transistors of FIG. 2 are held in the off state during the omitted cycle. In this way, core and switching losses are halved at 1/10 maximum power output. At even lower power outputs, for example 1/100th the maximum, it may be chosen to omit 9 out of 10 DC-DC converter switching cycles, which reduces the core and switching losses even further. Upon detecting an increase in load current or reduction of any voltage, the number of omitted switching cycles may be instantaneously reduced in anticipation of the need to supply greater current to the reservoir capacitors.

A transformerless DC to AC converter has no output transformer to block DC outputs that could arise from imperfect adjustment, asymmetrical load current waveforms, or fault conditions. Since it is undesirable to feed DC voltages to AC loads, other means to prevent DC bias from arising at the AC output are desirable.

According to embodiments of the present invention, various safeguards to prevent unwanted DC output bias are disclosed. A first step in limiting DC output is to determine the DC bias at the AC output. This is done by connecting the AC output to a DC bias determining circuit such as that shown in FIG. 3. Such a circuit may be preconstructed as a plug-in module if such a construction is useful for manufacture or later maintainability.

The AC output of the inverter comprises Line and Neutral. The Line voltage passes through a small instrumentation transformer (540) to low pass filter (500). The inductance of the instrumentation transformer reacts with the first shunt capacitor to add to the low pass filtering effect, and the capacitor completes the path for the AC current through the transformer back to the Neutral line. The instrumentation transformer may also have a secondary that provides an isolated sample of the AC output voltage reduced to a level suitable for monitoring purposes. The AC sample may be exchanged between two or more inverters to phase-synchronize them to produce split phase or three phase power.

The output of low pass filter (500) comprises the DC bias error of the inverter AC output with the line frequency (e.g., 50 or 60 Hz) removed. At this point, the DC bias error is referred to neutral. It is more convenient however to have the DC bias error referred to ground, as the control circuitry is more conveniently powered with respect to ground. Although neutral is a grounded conductor, it is only permitted to be grounded at one place, the service entrance, and may not be grounded at all if some fault occurs in the premises wiring. Therefore opto-isolation amplifier (510) is used to amplify the DC offset from low pass filter (500) and to transfer it to the grounded domain of the control circuitry. Other means to eliminate the AC ripple from the measured DC component can be used. For example, a 60 Hz notch filter such as a twin-T RC-notch circuit can be used, thus allowing the low-pass filtering to be relaxed, speeding up its reaction time. Alternatively, the DC bias measurement can be digitized twice per cycle, a half-cycle apart, and the two values averaged to produce a ripple-free measurement.

The amplified DC bias error output from opto-isolated amplifier (510) is output on pin 2 of module connector J1 and may be connected to an external Analog to Digital Converter (ADC) to produce a numerical value corresponding to the determined DC offset. It is also fed to positive and negative limit comparators (520), which produce outputs if the DC error exceeds a positive or a negative limit, respectively.

In the exemplary circuit of FIG. 3, the outputs from the positive and negative limit comparators are OR-ed by the following logic circuits to produce a logical DC error indication which can be hardwired to a fast-acting DC bias error mitigation means, pending the slower evaluation of the numerical values of DC bias error.

Mode input (530) may be used to inhibit the fast-acting DC bias mitigation means if the inverter AC output is disconnected from the load, thus facilitating the control circuitry to adjust DC bias error to zero in the off-load condition. Given the teachings of the present disclosure, different versions of the circuit of FIG. 3 can be designed by persons of ordinary skill in the art, including for example a version that outputs separate DC bias error indications for exceeding the positive and negative limits, rather than OR-ing them as shown.

FIG. 4 shows the circuit of a controlled full H-bridge comprising MOSFETs Q1, Q2, Q3, and Q4. The MOSFETs also have intrinsic drain-source diodes D1, D2, D3, and D4 respectively, which prevent reverse bias. The sources of the lower pair of MOSFETs Q2 and Q4 are connected to the negative of a floating DC source while the drains of the upper pair of MOSFETs Q1 and Q3 are connected to the positive of the floating DC source. Q1 source and Q2 drain are connected to a first output terminal (620) while the source of Q3 and the drain of Q4 are connected to a second output terminal (630). By turning on Q1 and Q4, the DC positive is connected to output to the first output terminal while the DC negative is connected to the second output terminal. Alternatively if Q3 and Q2 are turned on, the DC negative is connected to the first output terminal while DC positive is connected to the second output terminal.

first safeguard against a gross unwanted DC output from persisting longer than a predetermined time due to an internal fault condition.

Gate drivers (600, 610) do not permit both of their controlled MOSFETs to be on at the same time, but they do permit both to be off. This is selected by applying a logic "1" to the "OFF" control pin of the relevant gate driver. Thus the following H-bridge states can be created by controlling the two HLin inputs and the two OFF inputs:

| OFF1 | OFF2 | HLin1 | HLin2 | MOSFET states | TERM 620 voltage | TERM 630 voltage |
|---|---|---|---|---|---|---|
| 0 | 0 | 0 | 0 | Q2, Q4 = ON; Q1, Q3 = OFF | Vdc− | Vdc− |
| 0 | 0 | 0 | 1 | Q3, Q2 = ON; Q1, Q4 = OFF | Vdc− | Vdc+ |
| 0 | 0 | 1 | 0 | Q1, Q4 = ON; Q1, Q3 = OFF | Vdc+ | Vdc− |
| 0 | 0 | 1 | 1 | Q1, Q3 = ON; Q2, Q4 = OFF | Vdc+ | Vdc+ |
| 0 | 1 | 0 | x | Q1, Q3, Q4 = OFF; Q2 = ON | Vdc− | Vdc− < V < Vdc+ |
| 0 | 1 | 1 | x | Q2, Q3, Q4 = OFF; Q1 = 0N | Vdc+ | Vdc− < V < Vdc+ |
| 1 | 0 | x | 0 | Q1, Q2, Q3 = OFF; Q4 = 0N | Vdc− < V < Vdc+ | Vdc− |
| 1 | 0 | x | 1 | Q1, Q2, Q4 = OFF; Q3 = ON | Vdc− < V < Vdc+ | Vdc+ |
| 1 | 1 | x | x | Q1, Q2, Q3, Q4 = OFF | Vdc− < V < Vdc+ | Vdc− < V < Vdc+ |

When Q1 is turned on, Q2 is never turned on as this would short the supply. Likewise when Q4 is turned on Q3 is never turned on. These restrictions are enforced within gate drivers (600, 610) which may for example be Silicon Labs gate drivers part number Si8231. The Si8231 gate drivers have a logic input "HLin" (High-Low control input) which in one state turns the upper (High) transistor Q1 on and the lower transistor Q2 off and in the other state controls Q2 on and Q1 off. To turn Q2 on, approximately +10 volts must be applied to Q2 gate relative to its source, which is the DC source negative. This is provided by a driver supply that is referenced to the DC negative. On the other hand, to turn Q1 on, +10 volts must be applied to Q1 gate referenced to its source, which is output terminal (620). This reference moves with the potential selected to appear at output terminal (620), and so must be generated by bootstrap components D5 and C2 which operate as follows:

On any occasion that Q2 is turned on, the drain of Q2 is pulled to the DC source negative and pulls one end of C2 with it. The other end of C2 is then charged through diode D5 to the driver supply voltage. Thus, as long as Q2 is periodically turned on, C2 remains charged to the driver supply voltage and maintains it relative to Q1 source when Q2 is turned off and Q1 on, both ends of C2 rising together with Q1 source. On the other hand, if Q2 stops turning on periodically, C2 cannot maintain the gate drive voltage forever. The time for which it can maintain the gate drive voltage necessary to turn Q1 on can be determined by deliberately adding a leak resistor across C2 if necessary. If Q1 and Q2 therefore cease to switch alternately and stick in the state Q2 off, Q1 on, then the charge on C2 will decay. When the charge has decayed to a threshold called the Low Voltage Lockout threshold (LVLO), which is an internal feature of most gate drivers such as the Si8231, then the drive abruptly switches off Q1. This is to prevent a "half on" state in which the transistor might have substantial voltage drop across it with substantial current going through it, causing excessive heating. The arrangement just discussed with respect to controlling Q1 and Q2 is used symmetrically for Q3 and Q4. In order to get an unwanted DC polarity between terminals (620, 630) which persists, at least one of Q1 and Q3 must be on, but as just seen, the use of leak resistors across C2 and C4 can limit the time during which this condition can persist. This arrangement constitutes a The above table shows that, in the first state (0000) there is zero voltage between the output terminals (620, 630) as both are at the same potential of Vdc−. A current may be flowing between the first and second terminals nevertheless if caused by external conditions, as the impedance between the terminals is low, being the Rds-ON of Q2 and Q4 in series. In the second state (0001), there is positive voltage equal to the DC source voltage Vdc from terminal 630 to terminal 620, while in the third state (0010) there is a negative voltage of −Vdc. The fourth state (0011) is similar to the first state except that both terminals are connected to Vdc+. In the remaining rows of the above table, one or other terminal receives an indeterminate voltage because both transistors connected to it are off. The voltage is constrained by the associated intrinsic diodes nevertheless to be not greater than Vdc+(plus the 0.7 v drop of a forward biased diode) and not less than Vdc− (minus the 0.7 volt diode drop). Thus in the fifth state (010x) the voltage from terminal 630 to terminal 620 lies in the range −0.7 to +Vdc+0.7 while in the sixth state (011x) it lies in the range −Vdc−0.7 to +0.7. In the seventh state the voltage from terminal 630 to terminal 620 also lies in the range −Vdc−0.7 to +0.7 while the eighth state is the same as the 5th state. In the ninth state (11xx) the voltage lies anywhere in the range −Vdc−0.7 to +Vdc+0.7. The indeterminate states in the above table are akin to inserting a dead band in the voltage scale where the voltage is only known to lie between certain limits, as defined by other circumstances. These states may also be used to limit unwanted DC bias at the output of a DC to AC converter when an unwanted DC bias is detected on the output that cannot be corrected by other means.

In the prior art of DC to DC converters, in which a DC voltage was switched by switching transistors alternately from one end of center tapped transformer to the other (as in FIG. 2), if the switching half cycles were not of identical duration, a net current could build up in the windings with a consequent net high DC bias flux in the magnetic core. To prevent this, it was known to insert a short period in the time domain between half cycles when both transistors were off to allow the voltage to find its own level and thus allow unwanted DC bias build up to decay. This is known as notching. In the present application, one technique to avoid DC bias at the output of a DC to AC converter could also alikened to notching. The technique will thus henceforth be referred to as "notching" for brevity.

FIG. 5 shows the step-approximation to a sinewave produced by the inverter of FIG. 1 when notching is not employed. Every step is defined to be a certain voltage by the ternary control signals applied to the H-bridges 120a, 120b, 120c, and 120d of FIG. 1. If for any reason the voltage of a step in the positive half cycle is not the exact negative of the mirror-image step of the negative half cycle, the waveform may acquire a net DC bias in the mean. As mentioned above, this can occur when the inverter is feeding a half-wave rectifier so that the current waveform is asymmetrical. Due to internal resistive losses, a higher current on one half cycle will cause a greater output voltage drop than on the other half cycle, thus causing a small DC bias on the output. For example, if internal loss resistance is of the order of 10 milliohms, and a half wave rectifier takes a 60 amp pulse on one half cycle and not the other, then there will be a 0.6 volt greater drop of peak voltage on that half cycle than the other. This gives a clue as to the order of DC offset under normal operation and no-fault conditions that may occur.

One means for correcting DC offset, caused by one half cycle being of lower voltage than the other due to asymmetrical loading by a non-linear load, would be to increase the voltage of the low-voltage half cycle and/or to reduce the voltage of the high-voltage half cycle. Alternatively, when the voltage waveform comprises a number of voltage steps of predetermined voltage, a DC bias can be corrected by transitioning from a lower voltage step to a higher voltage step a little earlier and transitioning from a higher voltage step to a lower voltage step a little later, thereby increasing the volt time integral over a cycle, which is equivalent to adding a DC value. For example, an exemplary timing clock is 11.0592 MHz divided by 8, or 1.3824 MHz, which is a clock period of 0.723 uS, of which there are 23040 pulses in one 60 Hz cycle. If every transition to a higher voltage step is made one clock cycle earlier and every transition to a lower voltage step is made one cycle later, the effect will be to increase the volt time integral over a cycle by the voltage step size of 4.44 volts times the clock period of 0.723 uS times the number of transitions per cycle, which is approximately 162, giving the result 520.3E-6 volt-seconds. This is equivalent to the addition of a 31.2 mV DC offset over one whole 60 Hz cycle.

In the ternary step-approximation inverter of FIG. 1, it was described above how a memory-efficient way of storing the MOSFET drive waveforms to generate a good 60 Hz sinewave approximation is to store the times, as determined by a counter timer, at which the next set of drive bits will applied to the H-bridges. Each H-bridge requires 2 bits of control, giving 8 bits or one byte to control all four. A table of the delta-count between successive byte outputs may be stored and each delta-count can be constrained to be between 1 and 255 by using two or more delta counts associated with the same control byte value for longer delta-times. Therefore a set of control values to generate one 60 Hz cycle comprises a table of byte-values and a table of associated one byte delta-time counts. Different tables may be stored, each of which will produce the desired 120 volts rms AC output with a different given DC input, so that selecting the table to use in dependence on the measured DC input voltage provides a means to keep the AC output voltage constant in the face of changes in the DC input voltage. The sum of the delta time-counts must equal the number of counter-timer clock counts in one 60 Hz cycle, that is: 11059200/(8×60)=23040, with the exemplary 11.0592 MHz crystal.

If the first delta-time count after the zero-crossing heading into a positive half cycle is increased by 1 clock, all subsequent transitions will be delayed by one clock cycle, thus reducing the volt-time integral of the waveform at least up until the positive peak. If the next delta-count after the positive peak is reduced by a first count to bring it back to the original timing and then by a second count to advance the timing by one count, then all transitions on the way down from the positive peak will be advanced by one clock cycle, also reducing the volt-time integral of the waveform of the positive half cycle. The timing advance may be allowed to persist through to the negative peak at which point the timing is retarded by two clock cycles for one transition, resulting in all of the transitions on the way up to the zero crossing on the negative half cycle being delayed, thus increasing the magnitude of the voltage time integral of the negative half cycle. The combination of the above waveform modifications is to apply a negative DC bias shift to the waveform over one cycle, which can be used to cancel an unwanted positive DC bias.

If modifications are made to more of the delta-time counts than one, or more are made at zero-crossings or waveform peaks, then the effect on timing will be cumulative, allowing greater DC offsets to be compensated. Moreover, the shape of the waveform change can be tailored to better undo the distortion caused by a non-linear load such as a half-wave rectifier. One implementation is to store a third table of precomputed timing modifications to be applied to the default timing tables in order to apply a predetermined waveform correction aimed at correcting a specific amount of DC bias. Several such sets of DC bias-correcting waveform modifications may be stored and used to correct varying amounts of DC bias.

Measuring the DC bias, applying a correction to the waveform designed to compensate for the measured DC bias and then re-measuring the DC bias constitutes a negative feedback loop, and since the loop contains low pass filters to eliminate the line frequency component and delays, well-known control-theory principles must be applied to ensure good stability and transient response to load changes. It is recommended that correct operation of a candidate design be verified by computer simulation.

A flow chart for generating the output waveform using tables stored in a microprocessor memory is shown in FIG. 6. Upon the previously-set timer-count expiring, the counter-timer interrupt vectors the program flow to step 1, where the counter is immediately programmed with the next timer count which has been pre-prepared. To reduce delay, the pre-prepared time count may for example be held in a reserved register. Likewise, the next control byte to control the four H-bridges may have been prefetched and held in another reserved register so that it can be immediately output at step 1. Now the processor has time until the next timer-count expires to prepare the next timer count and prefetch the next control byte.

First, the waveform sample count is decremented at step 1. Then at step 2, a test is made to determine if the end of a complete 60 Hz cycle has been reached. If the end of a cycle has been reached, the program proceeds to step 3A. At step 3A, the address of the waveform table to use is reset to the start of a waveform table. This may have been changed to a different table than was used for the just completed cycle by a slower-time routine that measures the DC input voltage and determines a waveform table to use that will produce the closest to a 120V rms AC output. The number of points in a new table may be different than the number of points in the previously used table, therefore at step 4A, the number of points in a cycle using the new table is read from the table, and at step 4A, the waveform sample counter is reset to the number of points read from the table.

At step 6A, the first H-bridge control byte is read from the table. At step 7A, the first timer-count is read from the table. At step 8A, the start address of a waveform modification table is read. This may be an address to a different waveform modification table than was used last time, the contents of which have been pre-prepared by slower-time software for the purpose of compensating for measured DC offset. At step 9A, the timer count is modified by the first modification value obtained from the waveform modification table. To reduce execution time, all of the tables can be located on 256-page boundaries so that their addresses may be manipulated by changing only the least significant byte of the address. At step 10, the pre-prepared modified time count is saved, for example in a reserved register, and at step 11 a return from interrupt is made to allow slower-time software to run in the remaining processor cycles.

If at step 2 it is determined that the sample counter is not zero, the program proceeds to step 3B where the table addresses are incremented to point to the next H-bridge control byte, next timer-count, and next timer-count modification value. At step 4B, the next H-bridge control byte is prefetched into a reserved register, for example, and at step 5B the next timer count is obtained from the timer-count table. At step 6B, the next waveform modification value is obtained from the waveform modification table and used to modify the timer count, which is then saved in a reserved register, for example, at step 10. Then a return from interrupt is made at step 11. Thus by pre-preparing values to be output at next interrupt, accurate real-time control of the H-bridges is achieved for accurate waveform generation.

The waveform modification values may only comprise the values +1, 0 or −1. If every timer value on the rising part of the positive half cycle between the start of the cycle and the peak is increased by +1 count, and there are, as is typical, 40 steps, then the final step in that quarter cycle will have been delayed by the sum of the waveform modification values—that is, 40 counts. Now on the falling quarter-cycle of the sinewave from the peak value down to the negative-going zero crossing, the first step-down must be time-advanced by twice the cumulative amount that the corresponding last step-up was retarded. If the first step down thereby would occur before the last step up, then the last step up and the first step down erase each other and the last waveform step-up at the positive peak shall be omitted.

Step 6B of waveform modification therefore shall comprise detecting this state and if the last waveform step of a half cycle is to be omitted, the waveform sample counter must be decremented by an additional count. Whether this shall occur can be predetermined and a special code included in the waveform modification table to signal omission of a step. Thus the values in the waveform modification table, while normally comprising only +1, 0 or −1, may comprise values up to +/−40 around the positive and negative peaks and a value outside the range +/−40, for example hex80=−128 may be used to signal omission of a step. Correspondingly, if step timings heading to a peak have been cumulatively advanced by up to 40 clock cycles and upon traversing the peak the first value is to be retarded by twice that cumulative amount, and addition of 80 to the first timer-count after the peak produces a value exceeding 255, then it is necessary to break that step into two steps of less than 255 by inserting an additional period of the same step value or an additional step up to a higher voltage value, if available. Thus the value hex7F=127 may be used to signal insertion of a step with the same or higher ternary value represented by the H-bridge control byte value, and the sample downcounter is correspondingly incremented.

Another way to compensate for DC offset is to generate one half cycle using a time/step table designed to produce the desired 120 volts rms AC output for a first DC input voltage and to generate the other half cycle using a time/step table designed to produce 120 volts rms AC output for a second DC input voltage. When used alternately for the same DC input voltage, the two half cycles of opposite polarity will thus be of slightly different size, yielding a DC offset that can be allowed to persist as long as necessary to correct the measured integral of DC offset on the output. Correcting the DC offset using its value and the integral of its value is tantamount to the use of a Proportional-Integral (PI) controller. A PI controller emphasizes the reduction of long term or persistent DC offset which is precisely what is needed to prevent DC imbalance current building up in transformer loads.

The foregoing description of waveform modification to compensate for DC offset is relevant to the method of sinewave generation using ternary steps. A different method of DC bias compensation may be used for the alternative, delta-sigma modulation method of approximating a sinewave. To obtain a good sinewave approximation using delta-sigma modulation, pulse width modulation, or other bit-density modulation method, the bit rate or pulse rate must be high enough that the output filter can smooth over the individual pulses. The pulse rate must therefore be significantly greater than the cut-off-frequency of the filter, which, with the component values of FIG. 7, is around 107 KHz. With such a cut-off frequency, a pulse rate of perhaps 1 MHz would be necessary. This is somewhat too fast for microprocessor software easily to generate the drive waveform for an H-bridge in real time, and therefore a custom hardware realization of a delta-sigma modulator would be used, such as a Field Programmable Gate Array (FPGA) or alternatively a fast, programmable, digital signal processor (DSP) may be used.

The DSP would for example digitally generate a 60 Hz sinewave internally at the desired bitrate for delta-sigma modulation. It would then form the difference between an instantaneous sinewave sample and a current output bit and integrate the error. On a positive half-cycle, if the error is negative, the next bit is made equal to 1, while if the error is positive the next bit is made equal to 0, and that bit drives the H-bridge to output the positive DC supply voltage or zero accordingly. On a negative half-cycle, if the error is negative the next output bit is made 0, while if the error is positive the next bit is made 1, and the bit drives the H-bridge to output zero or the DC input voltage inverted, accordingly. In order to synthesize a 120 v rms sinewave using this method, the DC input voltage must be at least 1.414 times higher, that is about 169 volts minimum.

A hardware or DSP realization of a delta-sigma waveform approximation can be compensated for unwanted DC bias at the output by simply adding the negative of the measured DC bias into the sinewave to be synthesized. An analog representation of such a digital hardware or DSP method is shown in FIG. 8.

The bit-density modulator of FIG. 8 is slightly different than a conventional delta-sigma modulator to take account of the preferred way to drive an H-bridge. One way to drive an H-bridge having a DC input of +/−170 volts is to cause it to output +170 volts for a "1" and −170 volts for a "0". By varying the ratio of 1's to 0's, the average output voltage is thereby controlled from −170 to +170, as required to generate a 120 v rms AC output after low pass filtering to remove the switching frequency. However, this requires a 340 volt center-tapped DC supply and would be likely to produce a DC bias on the output if the −170 v and +170 v DC supplies were not matched. Moreover, it makes no use of the other H-bridge states available, namely the zero volt output states.

According to the '822 patent incorporated above, a 170 volt floating DC supply may be used instead. When a positive half cycle of AC output is to be generated, the −ve of the DC supply is connected to neutral and the +ve is switched to the Line output according to the bit-density modulated waveform. Conversely, when a negative half cycle is to be output, the +ve to the 170 v supply is connected to neutral and the −ve of the supply is switched to the Line output using the bit-density modulation waveform. As was pointed out in the '822 patent, this results in a common mode square wave signal at the power line frequency appearing on the DC input lines, which is filtered to remove radio interference components and then has utility in detection of ground faults on the DC side. The equivalent bit-density generation scheme of FIG. 8 takes account of the above method.

In FIG. 8, the desired sinewave waveform (11), which may be scaled to +/−1 units peak or less, and may have the desired amount of scaled DC compensation combined with it, is applied to the +input of subtractor (12) and a feedback component reflecting how the H-bridges are controlled is applied to the −input of subtractor (12). The difference, or error, is then integrated in integrator (13). The goal is for the average error between the desired input and the bit-density modulated output to be zero; therefore the goal is to drive the integrator output, which is the mean value of the error, to zero. Accordingly, if the integrator output is greater than zero, meaning that the mean value of the bit density modulation waveform is low, a command is sent to the H-bridge to output a higher level, and vice versa. Thus quantizer (14) slices the integrator output to produce a "higher" or "lower" signal and latch (15) records that decision at each bit clock tick.

If a positive half cycle is being produced, as indicated by the sign input to level shifter (16) being +, the H-bridge will connect the −ve of the 170 v DC supply to neutral while causing the level shifter to output +1 for the "higher" level and 0 for the "lower" level. On the other hand, if a negative half cycle is being generated as indicated by a − sign input to level shifter (16), the H-bridge will be controlled to connect the +ve of the DC supply to neutral while causing the level shifter (16) to output 0 for the "higher" level and −1 for the "lower" level. Thus the circuit of FIG. 8 directly generates control signals for an H-bridge such as shown in FIG. 4, and by including the negative of the amount of measured DC bias on the AC output, suitably scaled, in the desired input waveform (11), DC bias is controlled to zero for this type of transformerless inverter.

In both the ternary approximation inverter and the bit-density modulation inverter, potential switching components that could cause radio interference are removed by the low-pass filter of FIG. 7. Such a low pass filter is substantially lossless to the power line frequency, but to prevent excessive ringing of the transient response on no load, high frequency damping must be provided by the 4.7 uF capacitor in series with the 3.3 ohm damping resistor. The 60 Hz current passed by the 4.7 uF capacitor to the 3.3 ohm resistor is already about ¼ amps, giving about 200 mW dissipation, and this loss is a limiting factor in using heavier filtering with larger capacitors. If necessary, the 3.3 ohm resistor can be shunted by a small inductor to bypass some of the 60 Hz current. This can allow a 10:1 increase in the capacitor values while still only losing about 1 watt in a now 1 ohm damping resistor. The output isolation relays may also be noted in FIG. 7 as providing the ultimate means to disconnect the load in the case of gross DC offset being detected under fault conditions; preferably, inverter switching ceases before opening the relays so that they open on zero voltage and current, avoiding contact stress and wear.

Several methods to control the output of unwanted DC bias from transformerless inverters of various types have been described above, all of which first involve assessing the level of the unwanted DC bias output. Depending on its magnitude, the assessed DC bias may then be categorized as a gross or catastrophic value, necessitating complete shutdown on the inverter to prevent damage to AC loads, or else may be assessed to be a small enough value to be correctable by means of a control loop. When the output of the inverter can only comprise a selection of fixed output voltage steps at controlled times, such a control loop controls the times rather than the voltage levels. Yet another method described above for temporarily limiting DC offset is to apply notching to the drive of one or more H-bridges, which results in them being open circuited as long as the measured DC bias remains over an undesired level. Should these methods be insufficient, a further safeguard against a large DC offset persisting for a long enough time under fault conditions to cause damage, it was further disclosed above that another safeguard that can be employed as well is to arrange that the MOSFET gate driver voltage generated by bootstrapping decays within a limited elapsed time to a level that will inhibit turning the associated MOSFET on, unless refreshed by a proper switching cycle.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating a transformerless DC to AC converter comprising circuitry including a plurality of transistor switches and a controller operative to control the switches to commutate DC inputs onto AC outputs so as to generate an approximation of an AC waveform at a desired power line frequency, comprising:
  monitoring a DC bias component on the AC output of the converter;
  comparing the DC bias component to a predetermined threshold; and
  only when the DC bias component is below the predetermined threshold, modifying, by the controller, the AC waveform generated, so as to reduce the DC bias component.

2. The method of claim 1, further comprising:
  if the DC bias component meets or exceeds the predetermined threshold, ceasing to generate the AC waveform.

3. The method of claim 2, wherein ceasing to generate the AC waveform comprises:
  ceasing to drive one or more switches used to commutate DC inputs onto AC outputs, thereby ceasing to generate the approximation of an AC waveform; and
  opening one or more AC output relays to disconnect the DC to AC converter from any AC load.

4. The method of claim 1, wherein modifying, by the controller, the AC waveform generated, so as to reduce the DC bias component, comprises:
determining whether the DC bias component is positive or negative;
if the DC bias component is positive, performing one or both of
reducing a volt-time integral of a positive half cycle of the AC waveform, and
increasing the volt-time integral of a negative half cycle of the AC waveform, so as to reduce a magnitude of the DC bias component; and
if the DC bias component is negative, performing one or both of increasing the volt-time integral of the positive half cycle of the AC waveform, and
reducing the volt-time integral of the negative half cycle of the AC waveform, so as to reduce the magnitude of the DC bias component.

5. The method of claim 1, wherein modifying, by the controller, the AC waveform generated, so as to reduce the DC bias component, comprises:
determining whether the DC bias component is positive or negative;
if the DC bias component is positive, performing one or both of
delaying a timing of transitions from a lower voltage point on the AC waveform to a higher voltage point on the AC waveform, and
advancing a timing of transitions from a higher voltage point on the AC waveform to a lower voltage point on the AC waveform, so as to reduce a magnitude of the DC bias component; and
if the DC bias component is negative, performing one or both of
advancing the timing of transitions from a lower voltage point on the AC waveform to a higher voltage point on the AC waveform, and
delaying the timing of transitions from a higher voltage point on the AC waveform to a lower voltage point on the AC waveform, so as to reduce the magnitude of the DC bias component.

6. A transformerless DC to AC converter, comprising:
circuitry connected between DC inputs and AC output, the circuitry including a plurality of transistor switches;
a controller operative to control the switches to commutate the DC inputs onto the AC outputs so as to generate, at the AC outputs, an approximation of an AC waveform at a desired power line frequency;
a measuring circuit connected to the controller and operative to continuously measure a value of a DC bias component on the AC output of the converter; and
wherein the controller is further operative to compare a magnitude of the DC bias component to a predetermined threshold and only when the DC bias component is below the predetermined threshold, to modify the AC waveform generated, so as to reduce the DC bias component.

7. The transformerless DC to AC converter of claim 6, wherein the controller is further operative to cease to generate the AC waveform if the magnitude of the DC bias component meets or exceeds the predetermined threshold.

8. The transformerless DC to AC converter of claim 7, further comprising:
one or more AC output isolation relays interposed between the transistor switches and the AC outputs; and
wherein the controller is operative to cease to generate the AC waveform by:
ceasing to drive one or more switches to commutate the DC inputs onto the AC outputs, thereby ceasing to generate the approximation of an AC waveform; and
opening one or more of the AC output isolation relays to disconnect the DC to AC converter from any AC load.

9. The transformerless DC to AC converter of claim 8, wherein, after opening one or more AC output isolation relays, the controller is operative to:
automatically restart the DC to AC converter; and
modify the AC waveform generated, so as to reduce the DC bias component, with the load disconnected.

10. The transformerless DC to AC converter of claim 6, wherein the controller is operative to modify the AC waveform generated, so as to reduce the DC bias component, by:
determining whether the DC bias component is positive or negative;
if the DC bias component is positive, performing one or both of
reducing a volt-time integral of a positive half cycle of the AC waveform, and
increasing the volt-time integral of a negative half cycle of the AC waveform, so as to reduce the magnitude of the DC bias component; and
if the DC bias component is negative, performing one or both of
increasing the volt-time integral of the positive half cycle of the AC waveform, and
reducing the volt-time integral of the negative half cycle of the AC waveform, so as to reduce the magnitude of the DC bias component.

11. The transformerless DC to AC converter of claim 10, wherein the controller is operative to increase or decrease the volt-time integral of a half cycle of the AC waveform by modifying a timing of switching the transistor switches.

12. The transformerless DC to AC converter of claim 6, wherein the controller is operative to modify the AC waveform generated, so as to reduce the DC bias component, by:
determining whether the DC bias component is positive or negative;
if the DC bias component is positive, performing one or both of
delaying a timing of transitions from a lower voltage point on the AC waveform to a higher voltage point on the AC waveform, and
advancing a timing of transitions from a higher voltage point on the AC waveform to a lower voltage point on the AC waveform, so as to reduce the magnitude of the DC bias component; and
if the DC bias component is negative, performing one or both of
advancing the timing of transitions from a lower voltage point on the AC waveform to a higher voltage point on the AC waveform, and
delaying the timing of transitions from a higher voltage point on the AC waveform to a lower voltage point on the AC waveform, so as to reduce the magnitude of the DC bias component.

13. The transformerless DC to AC converter of claim 6, wherein said plurality of transistor switches are connected in at least one H-bridge configuration comprising two upper transistors having drain terminals connected together and two lower transistors having source terminals connected together, and further comprising:
first and second H-bridge driver circuits, each generating drive signals for one upper and one lower transistor; an H-bridge driver power supply circuit supplying a DC voltage to the H-bridge driver circuits for the lower transistors;

first and second bootstrap circuits, each applying a DC voltage offset to source terminals of respective upper transistors when the corresponding lower transistors are off, such that a drive signal applied to a drain terminal of an upper transistor by the respective H-bridge driver circuit provides a sufficient gate-source voltage to turn the upper transistors on;

wherein, when a lower transistor fails to switch, due to a fault condition, for greater than a predetermined duration, the associated bootstrap DC voltage offset decays to a low-voltage lockout level that causes the associated H-bridge driver circuit to prevent the upper transistor from being turned on.

* * * * *